No. 834,390. PATENTED OCT. 30, 1906.
A. MAGUIN.
MACHINE FOR SHARPENING BEET SLICING KNIVES.
APPLICATION FILED DEC. 30, 1905.

2 SHEETS—SHEET 1.

WITNESSES:
Frank O'Connor
W. H. Pumphrey

INVENTOR
Alfred Maguin
BY
Geo. H. Benjamin
ATTORNEY

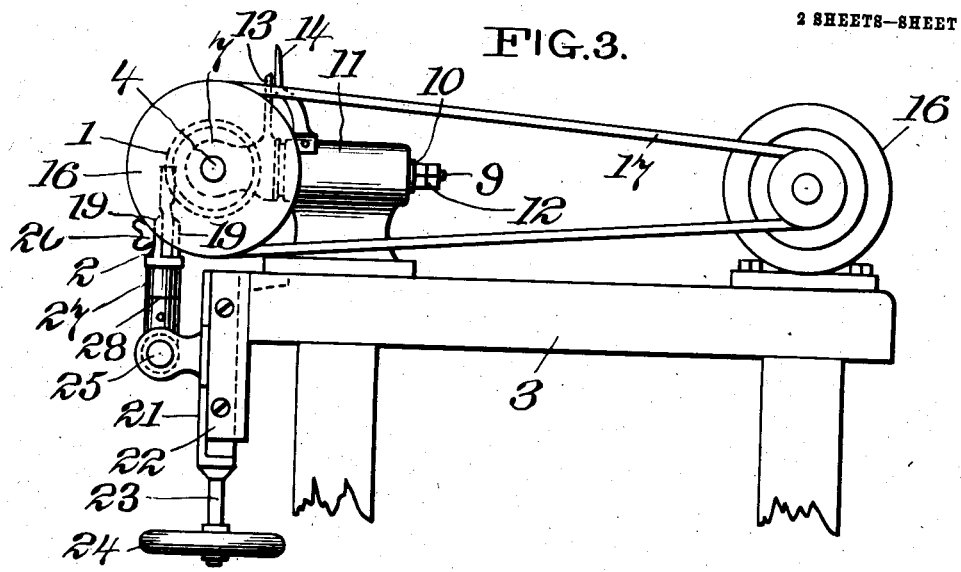

UNITED STATES PATENT OFFICE.

ALFRED MAGUIN, OF CHARMES, FRANCE.

MACHINE FOR SHARPENING BEET-SLICING KNIVES.

No. 834,390.  Specification of Letters Patent.  Patented Oct. 30, 1906.

Application filed December 30, 1905. Serial No. 293,978.

*To all whom it may concern:*

Be it known that I, ALFRED MAGUIN, a citizen of the Republic of France, residing at Charmes, France, have invented certain new and useful Improvements in Machines for Sharpening Beet-Slicing Knives, of which the following is a specification.

My invention relates generally to grinding-machines, and as herein embodied is particularly adapted for work such as beveling, truing-up, and finishing the cutting edge of blades having special or odd shapes—as, for example, the various forms of slicing-knives employed in cutting up sugar-beets and similar vegetables. In machines of this class the requisite adjustment of a reciprocating or rotating tool or cutter to shape, bevel, and finish a blade of any form may be readily effected automatically by comparatively simple mechanism; but the results obtained are not satisfactory. This is due largely to the fact that the blank from which the blade is made is not of a uniform degree of hardness throughout and when acted upon by a cutter geared to be fed and driven at a uniform speed noticeable irregularities are usually produced in the cutting edge of the blade and the cutters are frequently broken, &c.

The object of my invention is, therefore, to provide as an addition to the usual relative adjustment of the cutter and work along direct lines means which will enable the operator to manually shift the work off such lines and present the same to the cutter in accordance with the peculiarities and requirements developed as each blade is being ground.

The accompanying drawings will serve to illustrate a machine suitable for carrying my invention into effect. I wish it understood, however, that I do not limit myself to the same, as other forms may be employed, operating in substantially the same manner to produce practically the same result.

Figure 1:
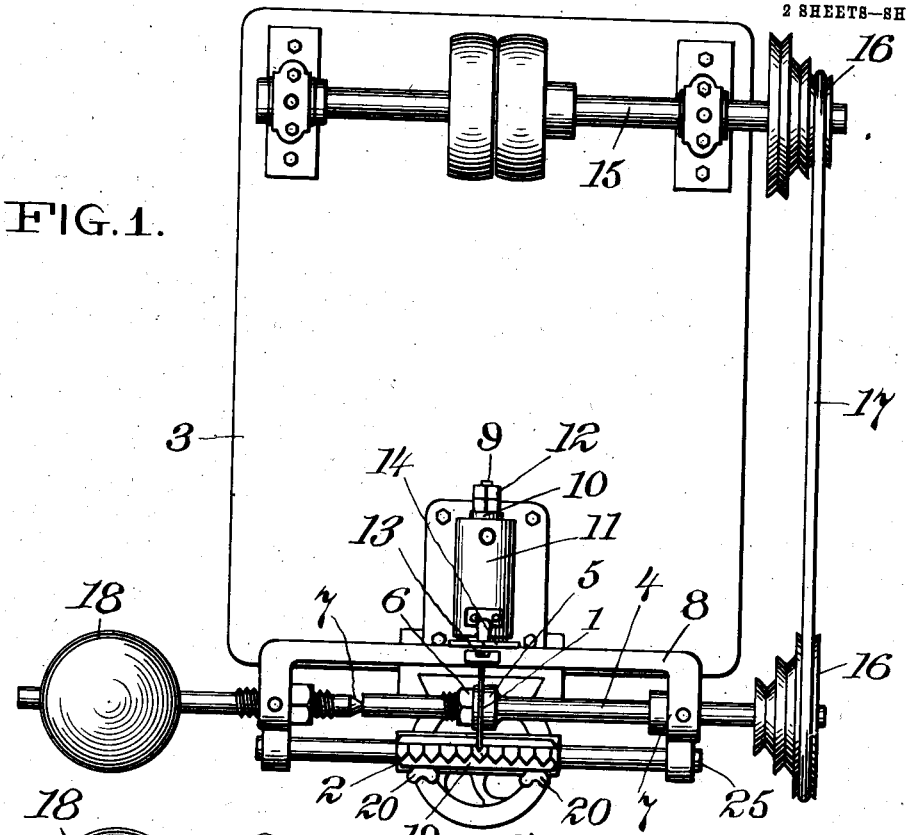
Figure 2:
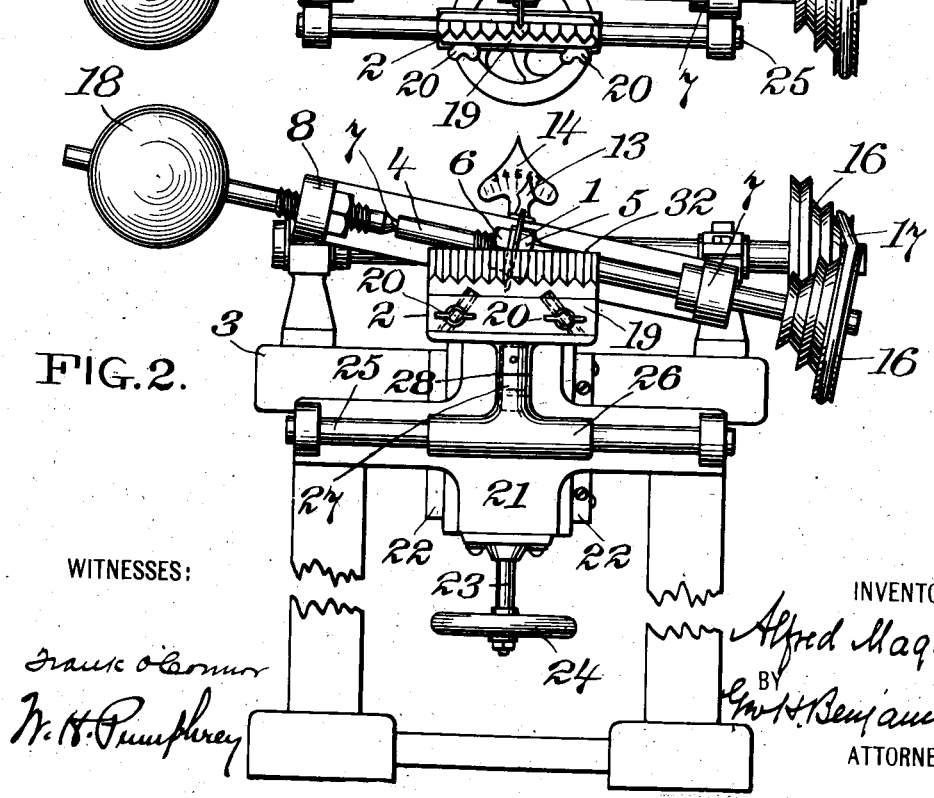

In the drawings, Figure 1 is a plan view of the machine. Fig. 2 is a front view thereof. Fig. 3 is a side view with the lower portion of the frame broken away. Fig. 4 is an enlarged detail sectional view showing the preferred form of flexible connection employed between the work-holding clamp and the carriage upon which it is mounted, and Fig. 5 is a detail perspective view showing the cutting end of a slicing-knife with the edge thereof beveled throughout a portion of its length and a rotary cutter in position to act thereon.

Referring now to the drawings, the machine shown consists, essentially, of a cutting-tool 1 and a work-holding clamp 2, mounted in adjustable relation to each other upon a bench or table 3. The cutting-tool employed is preferably of the rotary type—such as a circular file, emery disk, or the like—and is removably secured upon a shaft 4 between a fixed collar 5 and a clamp-nut 6 in the usual manner. The disk may be of a shape in cross-section approximating the form of the grooves in the cutting edge of the blade, as shown in Fig. 5, in order to facilitate the work of the operator and insure greater uniformity in the cut produced.

The shaft 4 is mounted in bearings 7 7 in a frame 8, which is adjustable about an axis 9, to permit the cutter to be set at any angle desired. The frame is provided for this purpose with a spindle 10, turning in a fixed bearing 11 and terminating beyond the bearing in a threaded extremity to receive clamp-nuts 12, which when tightened up serve to hold the frame 8 as adjusted, the angle or degree of adjustment being indicated by a pointer 13 thereon, movable over a fixed scale 14 upon the bearing 11. The shaft 4 is driven from a counter-shaft 15 through changeable-speed gearing consisting of cone-pulleys 16 16, fast upon the projecting ends of the shafts and connected by a belt 17. The weight of the pulley 16 at one end of the frame is counterbalanced by a ball 18 at the opposite end thereof to enable the frame to be swung with greater ease and also to avoid unnecessary strain upon the clamp-nuts 12, by which the frame is held in an adjusted position.

The work holder or clamp may be of any form or construction desired and consists ordinarily of two jaws 19 19, between which the work is held by clamp-nuts 20 20. The work-holder is mounted upon a carriage 21, adjustable vertically in fixed guides 22 by means of a screw-shaft 23, controlled by a hand-wheel 24. Mounted free to turn and slide upon a rod 25 of the carriage there is a sleeve 26, connected, as indicated at 27, to support the work-holding clamp in adjustable relation to the cutter.

As above stated, the cutter may be set at the required angle to the work to produce any cut or bevel desired, and as the work-holder has three adjustments relatively to the cutter the operator is not called upon to exercise a great amount of skill or judgment in beveling and finishing a blade, provided it is perfectly blanked and of uniform density and even temper throughout. As these conditions are seldom found present, however, it becomes necessary to depend upon the operator to move the blade by hand when being acted upon by the cutter somewhat out of the direct lines of adjustment provided for in order that good results may be obtained. As a means of facilitating this work of an operator in manually adjusting the blade relatively to the cutter and in order to render such adjustment temporary only and cause the parts when free to become readjusted to the angle for which the machine was originally set I form a flexible joint 28 in the connection 27 between the work-holding clamp and the carriage on which it is mounted, the same being preferably of a form suitable for permitting a limited universal adjustment of the work-holding clamp.

As shown in Fig. 4, the clamp and sleeve are provided with oppositely-disposed tubular extensions 29 29 to receive a piece of rubber or other elastic material 30, which is secured therein as a connection between the same by means of pins 31 31, extending at right angles to each other. While rubber forms a convenient material for this purpose, I do not limit myself to its use, as a helical spring or a strip of spring metal or any other form of flexible connection may be employed as a substitute therefor.

The operation is as follows: Ordinarily the blades are delivered to the machine with the edge to be beveled ground down perfectly straight, as indicated at 32 in Figs. 2 and 5, other portions thereof being finished in the rough. After a blade has been secured in the work-holder the adjustment of the frame follows to set the cutter at a proper angle to produce the desired bevel. The blade is then adjusted vertically by rotating the hand-wheel 24, and the machine is ready for operation. The operator swings the work-holder 2, with the blade clamped therein, up into a vertical position, as shown, and grasps the ends thereof firmly in his hands, with his thumbs pressing against the blade. Assuming the cutter to be rotating at a proper speed, the blade is first advanced, then withdrawn, and fed along as required to present corresponding sides of the several ribs 33 to the same. Thereafter the cutter is reset to bevel the opposite side of the ribs, and when this is completed a further adjustment is necessary for the V-shaped portions 34 thereof. Throughout the entire operation the yielding movement of the work-holder permitted by the flexible joint 28 enables the operator to shift the blade out of the direct line of adjustment as required and present the same to the cutter in a manner to insure an even cut and uniform bevel throughout and at the same time preserve the line of the cutting edge.

Having thus described my invention, I claim—

1. A grinding-machine, comprising in its construction, a cutting-tool, a flexible support for the work, and means for giving the tool movement relatively to the work.

2. A grinding-machine, comprising in its construction, a rotary cutter, a flexible support for the work, and requisite gearing for driving the cutter.

3. A grinding-machine, comprising in its construction, a rotary cutter, a flexible support for the work adjustably mounted relatively to the cutter, and requisite gearing for driving the cutter.

4. A grinding-machine, comprising in its construction, a rotary cutter, a work-holder, a flexible support for the work-holder permitting universal adjustment thereof, and requisite gearing for driving the cutter.

5. A grinding-machine, comprising in its construction, a rotary cutter, a carriage adjustable relatively to the cutter, a work-holder, a flexible connection interposed between the carriage and work-holder as a support for the latter, and requisite gearing for driving the cutter.

6. A grinding-machine, comprising in its construction, a rotary cutter, a flexibly-mounted work-holder, means for adjusting the cutter relatively to the work, and requisite gearing for driving the cutter.

7. A grinding-machine, comprising in its construction, a rotary cutter, a work-holder, means for adjusting the cutter and work-holder relatively to each other, a flexible support for the work-holder, and requisite driving-gearing for the cutter.

8. A grinding-machine, comprising in its construction, a rotary cutter, a shaft carrying the cutter, a frame having the shaft mounted therein, said frame being adjustable about an axis at right angles to that of the shaft, a work-holding clamp, an adjustable carriage upon which the clamp is mounted, a flexible connection interposed between the carriage and clamp as a support for the latter, and requisite driving-gearing for the cutter.

9. A grinding-machine comprising a rotary cutter vertically adjustable around a horizontal axis, a pivotally-mounted tool-holder adjustable to and from the cutter and in a horizontal direction relative thereto, and a flexible connection interposed between the tool-holder and its mounting.

10. A grinding-machine comprising a rotary cutter, a driving-shaft therefor, a pivotal bearing for the driving-shaft, means for fixing and indicating the position of said driving-shaft, and a flexibly-mounted tool-holder situated in front of the cutter and capable of having its position relative to the cutter altered at the will of the operator.

In testimony whereof I affix my signature in the presence of two witnesses.

ALFRED MAGUIN.

Witnesses:
 GASTON QUENARDEL,
 ABEL MAGUIN.